United States Patent
Natsume et al.

(10) Patent No.: US 10,507,922 B2
(45) Date of Patent: Dec. 17, 2019

(54) ENERGY ABSORBING BACKSHELL

(71) Applicant: Jamco Corporation, Tachikawa Tokyo (JP)

(72) Inventors: Norikazu Natsume, Mukilteo, WA (US); Steven Conboy, Seattle, WA (US); Nilesh Dingankar, Bothell, WA (US); John Cornell, Everett, WA (US); Allen Gipson, Everett, WA (US)

(73) Assignee: JAMCO CORPORATION, Tachikawa, Tokyo (JP)

( * ) Notice: Subject to any disclaimer, the term of this patent is extended or adjusted under 35 U.S.C. 154(b) by 2 days.

(21) Appl. No.: 15/799,504

(22) Filed: Oct. 31, 2017

(65) Prior Publication Data

US 2018/0222590 A1    Aug. 9, 2018

Related U.S. Application Data

(60) Provisional application No. 62/454,153, filed on Feb. 3, 2017.

(51) Int. Cl.
  *B64D 11/06* (2006.01)
  *B60N 2/427* (2006.01)

(52) U.S. Cl.
  CPC ...... *B64D 11/0619* (2014.12); *B64D 11/0606* (2014.12); *B64D 11/0646* (2014.12); *B60N 2/42709* (2013.01); *Y02T 50/46* (2013.01)

(58) Field of Classification Search
  USPC .............. 297/216.13, 216.14, 452.18, 452.2
  See application file for complete search history.

(56) References Cited

U.S. PATENT DOCUMENTS

| | | | |
|---|---|---|---|
| 3,482,875 A * | 12/1969 | Barecki | A47C 5/00 297/440.2 |
| 4,152,023 A * | 5/1979 | Buhk | A47C 3/026 297/450.1 |
| 4,474,391 A | 10/1984 | Matsuno et al. | |
| 4,792,189 A * | 12/1988 | Shovar | A47C 3/12 297/452.14 |
| 5,649,721 A | 7/1997 | Stafford et al. | |
| 5,836,547 A | 11/1998 | Koch et al. | |
| 5,882,072 A | 3/1999 | Morlock | |
| 5,895,096 A | 4/1999 | Massara | |
| 6,003,937 A | 12/1999 | Dutton et al. | |
| 6,679,550 B2 | 1/2004 | Goor et al. | |
| 6,733,064 B2 | 5/2004 | Fox et al. | |
| 7,404,593 B2 | 7/2008 | Cormier et al. | |
| 7,513,344 B2 | 4/2009 | Toccalino et al. | |
| 7,837,259 B2 | 11/2010 | Staab et al. | |
| 7,977,396 B2 | 7/2011 | Maurer et al. | |
| 9,254,770 B2 | 2/2016 | Nuyan et al. | |
| 2009/0184561 A1* | 7/2009 | Wilson | B60N 2/4214 297/452.2 |
| 2010/0301649 A1* | 12/2010 | Mathews | B60N 2/66 297/284.2 |
| 2012/0187738 A1* | 7/2012 | Gross | B21D 26/14 297/452.1 |
| 2015/0202999 A1 | 7/2015 | Jafri et al. | |
| 2016/0214518 A1* | 7/2016 | Ter Steeg | B29C 70/30 |

* cited by examiner

*Primary Examiner* — Joanne Silbermann
(74) *Attorney, Agent, or Firm* — Vedder Price P.C.

(57) ABSTRACT

An energy absorbing backshell including a non-metallic core, a non-metallic casing surrounding the non-metallic core, a tube on the top surface of the non-metallic core and non-metallic casing.

20 Claims, 7 Drawing Sheets

ENERGY ABSORBING BACKSHELL

PRIORITY CLAIM

The present disclosure is a Non-Provisional Patent Application claiming the benefit of and priority to U.S. Provisional Patent Application No. 62/454,153 filed on Feb. 3, 2017, which is incorporated by reference herein in its entirety.

BACKGROUND OF THE INVENTION

The potential for hard ground impact in an aircraft or other vehicle can lead to impact of passengers into seats located in front of the passenger's position. This impact can result in serious injury to passengers. Specifically, if a passenger's head impacts the back of a seat in front of the passenger, serious blunt force head trauma may result.

To reduce head injury in an impact scenario, air bags, upper torso restraints and seat back break over features are commonly employed. However, these devices are expensive to design and certify to applicable regulatory standards and have not proven to always perform in completely reliable manner. In addition, these devices add weight, complexity, increased maintenance costs, and reduce passenger comfort.

Therefore, a need exists for a seat backshell design that will absorb the energy of an impact to reduce injuries to passengers.

SUMMARY OF THE INVENTION

One embodiment of the present disclosure includes an energy absorbing backshell including a non-metallic core, a non-metallic casing surrounding the non-metallic core, and a tube on the top surface of the non-metallic core and non-metallic casing.

In another embodiment, the non-metallic core is adhered to the non-metallic casing by an adhesive.

In another embodiment, a cross section of the non-metallic core is honey combed shaped.

In another embodiment, the non-metallic core is made of a plurality of thin composite panels.

In another embodiment, a top surface of the non-metallic casing is affixed to the tube by a filler material.

In another embodiment, the tube is a bent metallic tube.

In another embodiment, the tube includes a curved back side that is connected to a straight side such that the curved side is opposite the straight side.

In another embodiment, a structural member may extend from an inner portion of the backshell of a first side of the backshell to an inner portion of an inner portion of a second side of the backshell.

In another embodiment, the first side is opposite the second side.

In another embodiment, a structural support back extending is formed along the periphery of a lower edge of the backshell.

Another embodiment of the present disclosure includes a method of forming an energy absorbing backshell, the method including the steps of forming a non-metallic casing surrounding the non-metallic core, and affixing a tube on the top surface of the non-metallic core and non-metallic casing.

Another embodiment includes the step of adhering the non-metallic core to the non-metallic casing by an adhesive.

In another embodiment, a cross section of the non-metallic core is honey combed shaped.

In another embodiment, the non-metallic core is made of a plurality of thin composite panels.

Another embodiment includes the step of affixing a top surface of the non-metallic casing to the tube by a filler material.

In another embodiment, the tube is a bent metallic tube.

In another embodiment, the tube includes a curved back side that is connected to a straight side such that the curved side is opposite the straight side.

Another embodiment includes the step of forming a structural member extending from an inner portion of the backshell of a first side of the backshell to an inner portion of an inner portion of a second side of the backshell.

Another embodiment includes the step of forming a structural support back extending along the periphery of a lower edge of the backshell.

BRIEF DESCRIPTION OF THE DRAWING

Details of the present invention, including non-limiting benefits and advantages, will become more readily apparent to those of ordinary skill in the relevant art after reviewing the following detailed description and accompanying drawings, wherein.

DETAILED DESCRIPTION OF THE INVENTION

While various embodiments of the present invention are described herein, it will be apparent to those of skill in the art that many more embodiments and implementations are possible that are within the scope of this invention. Accordingly, the present invention is not to be restricted except in light of the attached claims and their equivalents.

Figure 1:
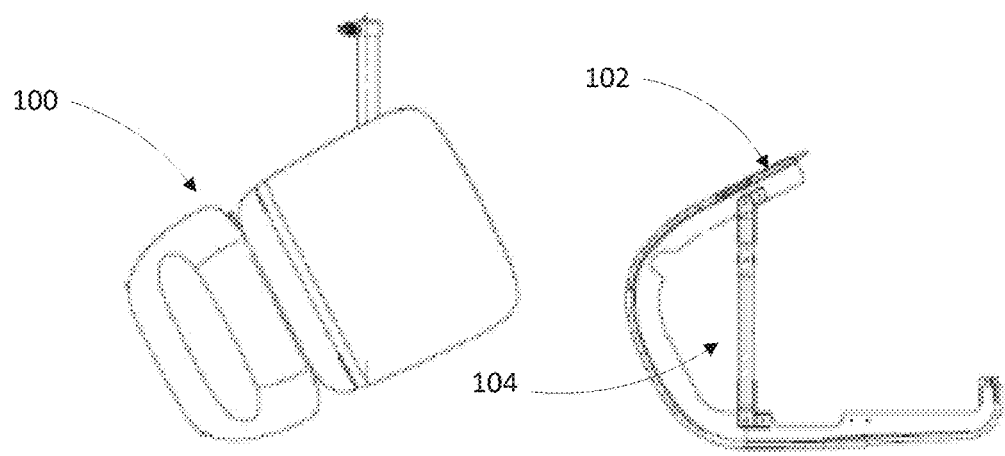
FIG. 1 depicts a top view of an energy absorbing backshell.

FIG. 1 depicts a top view of an energy absorbing backshell 100. The backshell shell 102 is substantially curved and includes a structural support member 104. The structural support member 104 extends from the inner portion of one side of the backshell shell 102 to the inner portion of an opposite side of the backshell 102.

Figure 2:
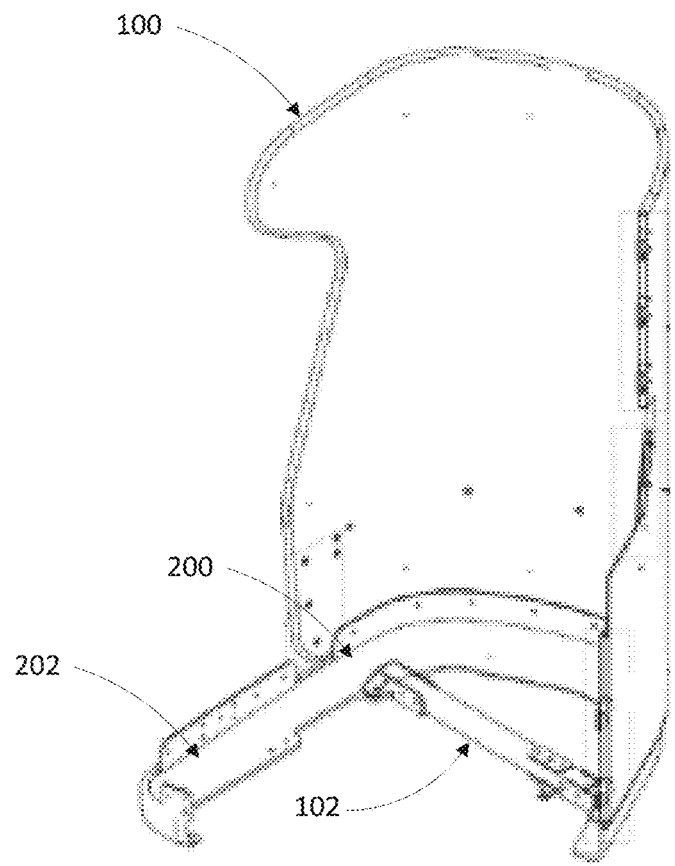
FIG. 2 depicts a perspective view of the energy absorbing backshell.
Figure 3:
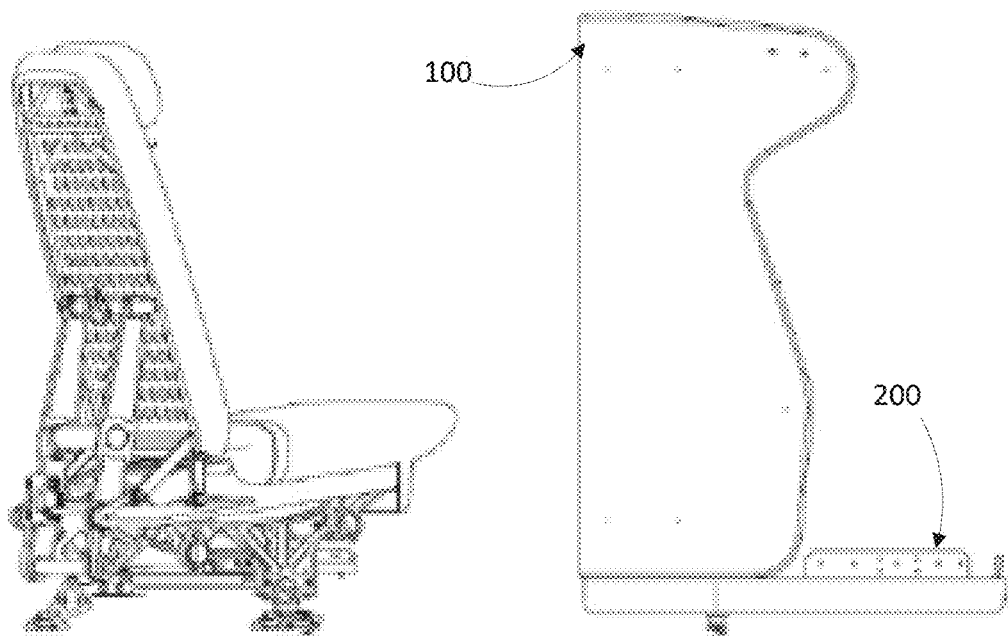
FIG. 3 depicts a side view of the energy absorbing backshell.
Figure 4:
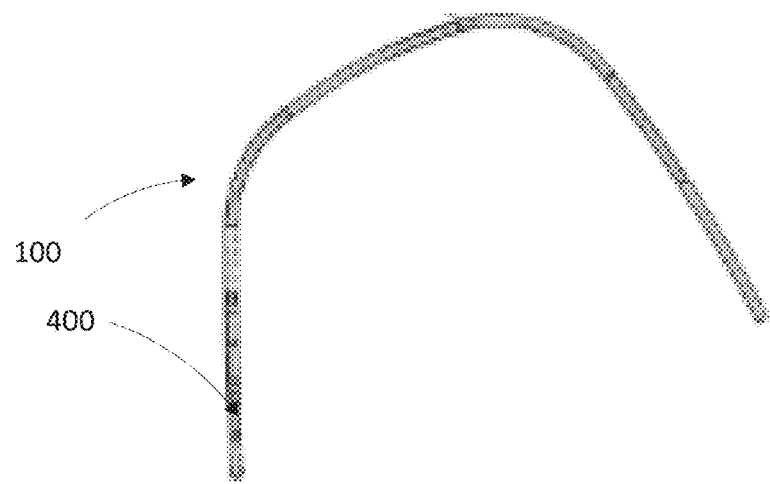
FIG. 4 depicts a top view of the bent metallic tube.

FIG. 2 depicts a perspective view of the energy absorbing backshell 100 in FIG. 1. The energy absorbing backshell 100 includes a structural support base portion 200. The structural support base portion 200 extends around the periphery of a lower portion of the backshell 100. An extension portion 202 of the structural base portion 200 extends beyond and edge of the backseat 100. FIG. 3 depicts a side view of the energy absorbing backshell 100. FIG. 4 depicts a top view of the bent metallic tube 400. The bent metallic tube 400 extends along the periphery of the top edge of the energy absorbing backshell 100.

Figure 5:
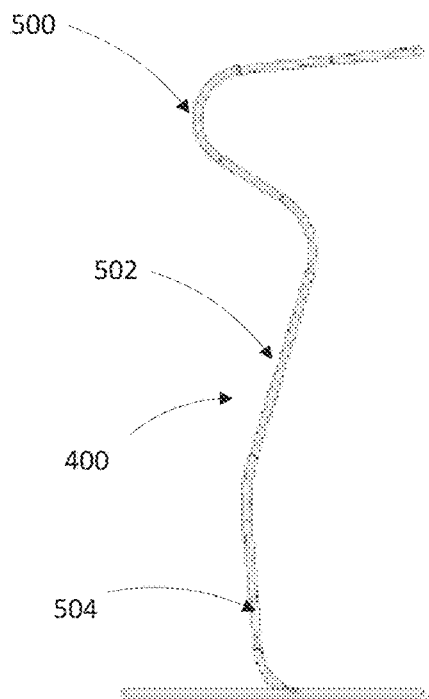
FIG. 5 depicts a side view of the bent metallic tube.

FIG. 5 depicts a side view of the bent metallic tube 400. The side of the bent metallic tube 400 includes a substantially curved portion 500 connected to an end of a straight portion 502 that with the opposite end of the straight portion 502 being connected to a second curved portion 504. In one embodiment, the first curved portion 500 is substantially U shaped. In one embodiment, the second curved portion is not substantially U shaped.

Figure 6:
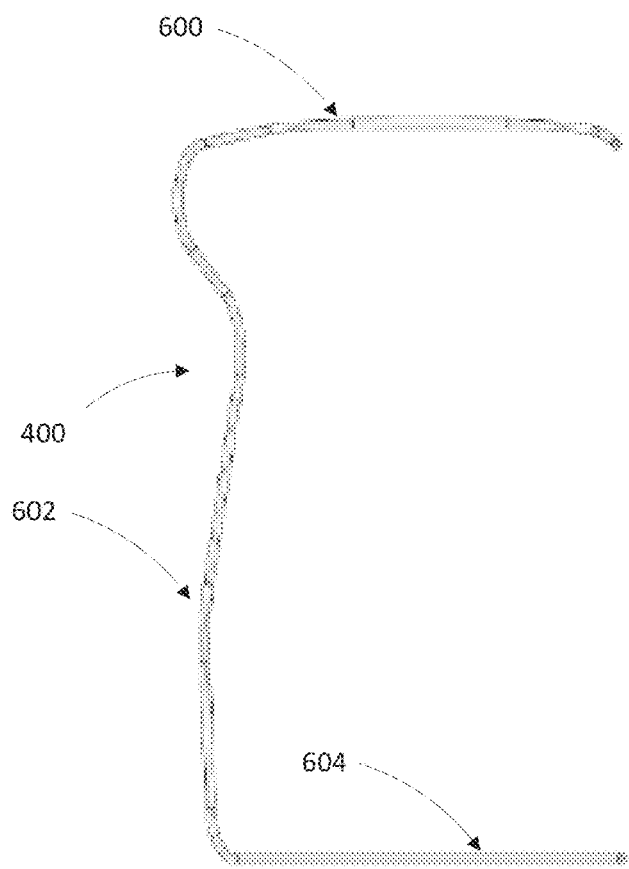
FIG. 6 depicts a front view of the bent metallic tube.

FIG. 6 depicts a front view of the bent metallic tube 400. The bent metallic tube 400 includes a curved side 600 connected to a curved back side 602 that is connected to a straight side 604 such that the curved side 600 is opposite the straight side 604.

Figure 7:
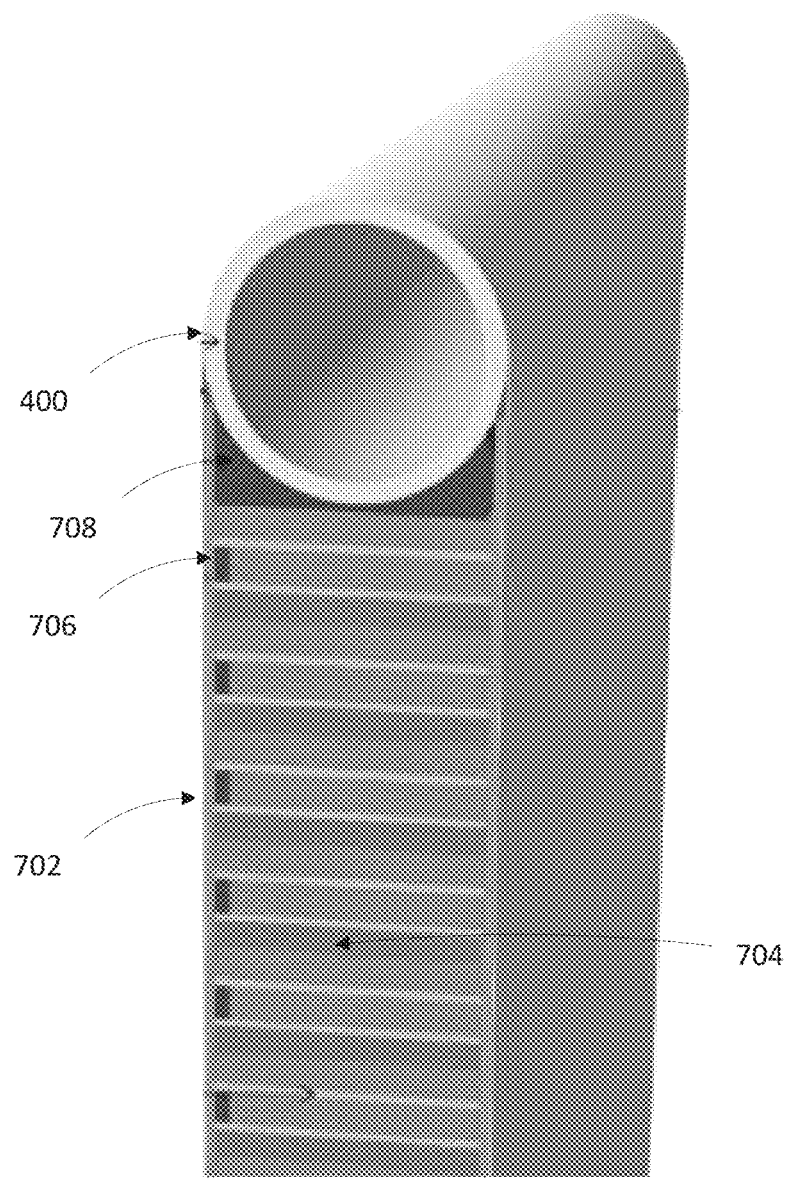
FIG. 7 depicts a cut away view of the detailed panel construction used in the backshell design and manufacturing.
Figure 8:
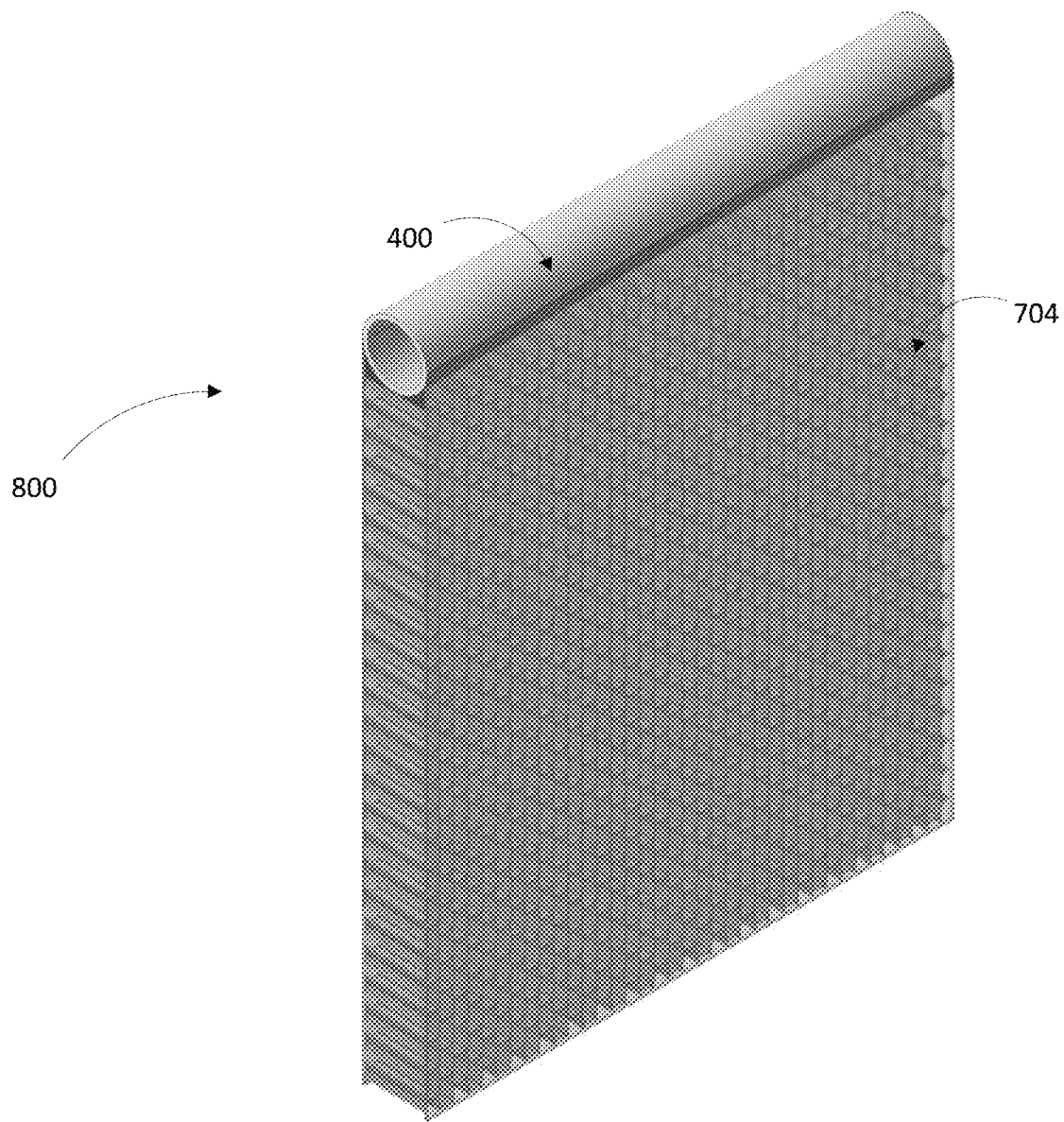
FIG. 8 depicts a cutaway view of another detailed panel construction used in the backshell design and manufacturing.
Figure 9:
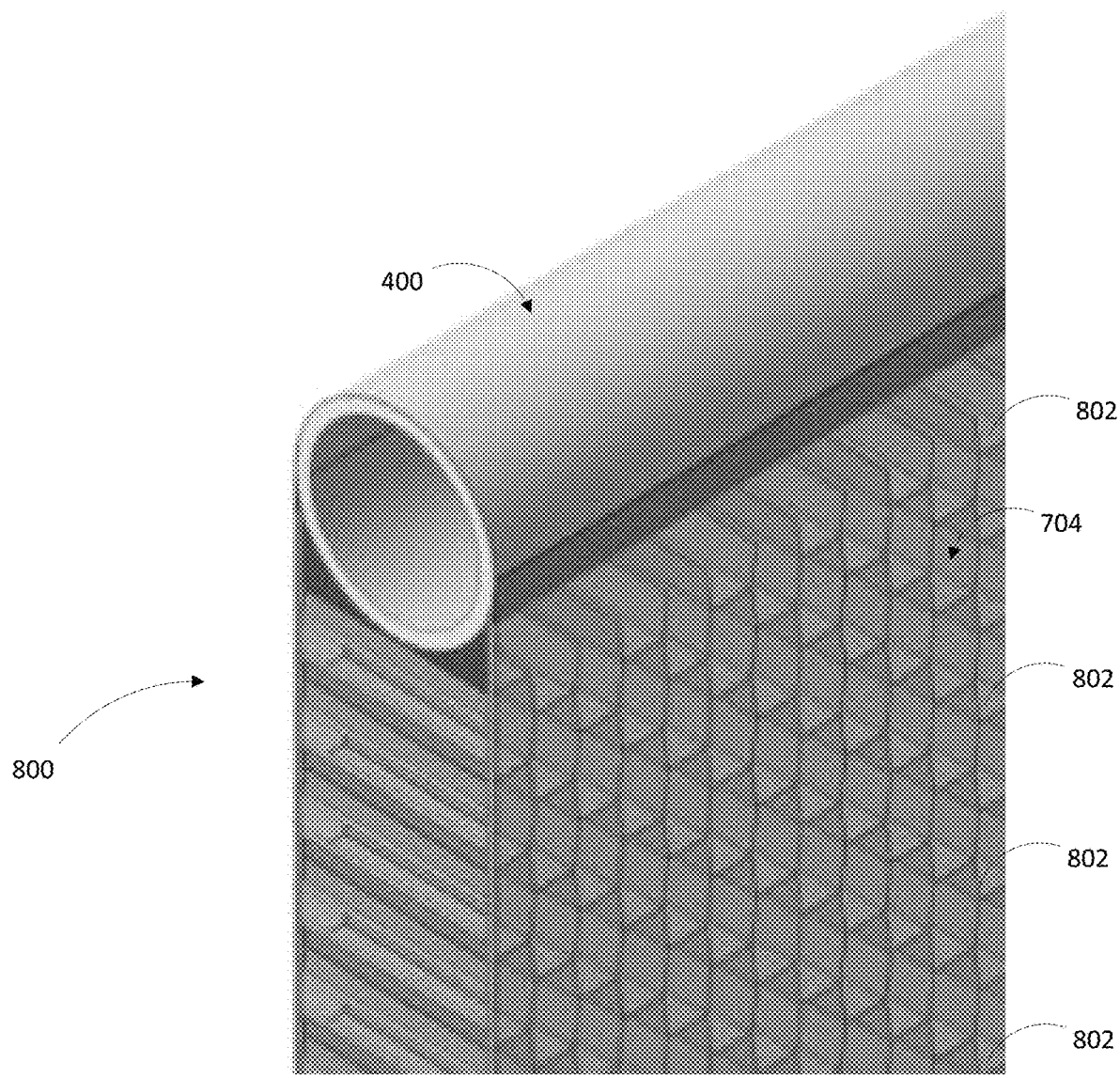
FIG. 9 depicts a close up of the cutaway view of the detailed panel construction illustrated in FIG. 9.
Figure 10:
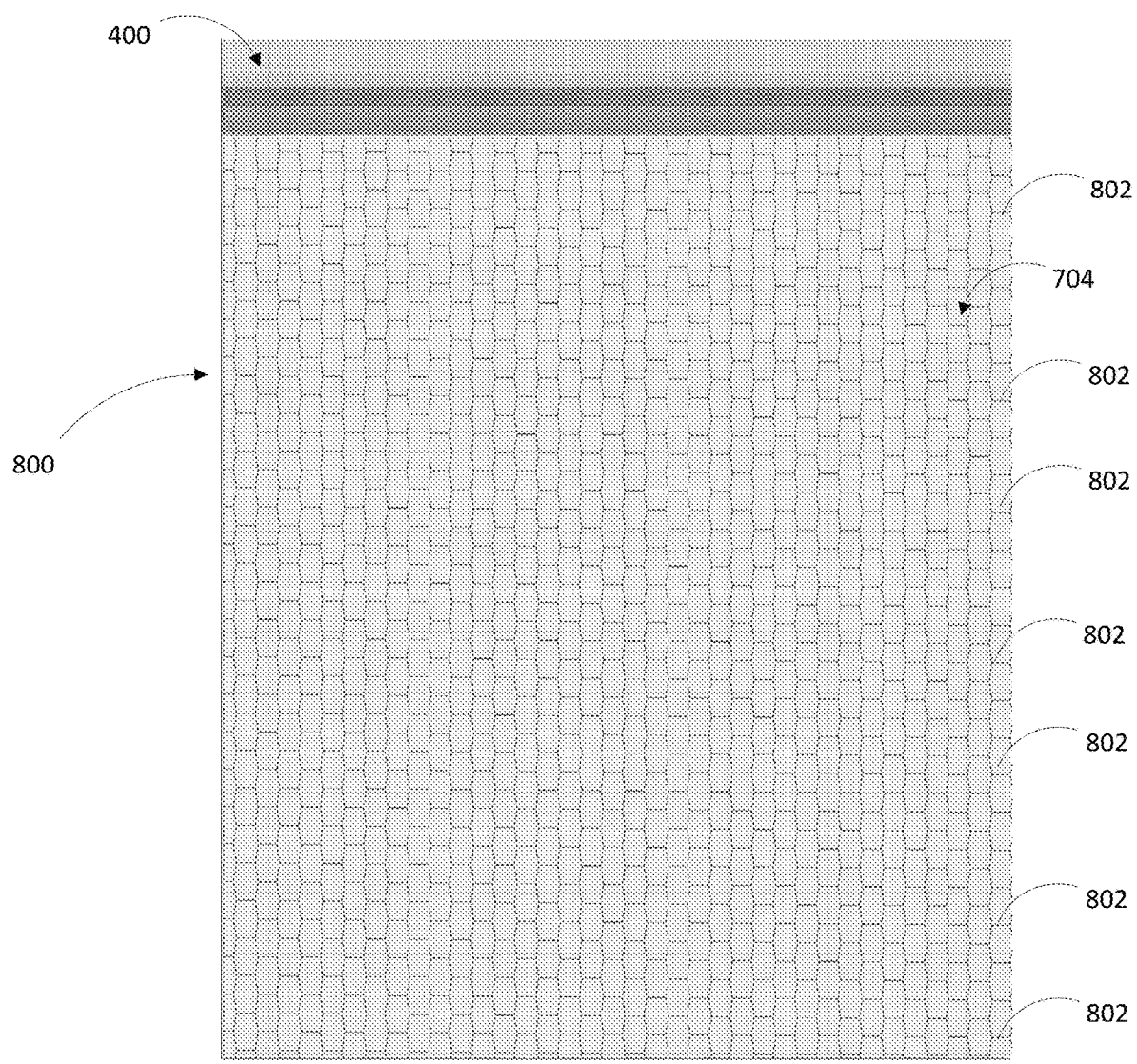
FIG. 10 illustrates a cross-sectional cutaway view of the detailed panel construction illustrated in FIG. 8 showing the non-metallic core as being honey combed shaped.

FIG. 7 depicts a detailed cut away view of the panel construction used in the design and manufacturing of the energy absorbing backshell 100. A non-metallic core 704 is encased in a non-metallic casing 702. The non-metallic core 704 is adhered to the non-metallic casing 702 by an adhesive film 706. In one embodiment, the non-metallic core 704 is honey combed shaped. In another embodiment, the non-metallic core 704 is made of plurality of thin composite panels. The bent metallic tube 400 is positioned on a self-expanding foam layer 708 on the top surface of the non-metallic core 704. The top surfaces of the non-metallic casing 702 are affixed to the bent metal tube 400 by a filler material 708.

By providing the structure described herein, a lighter weight backshell design can be achieved. Further, the design allows for local deformation at the point of impact of an object with the backshell. Specifically, the design allows for the absorption of larger forces resulting from the impact of an object.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. An energy absorbing backshell including:
a non-metallic core;
a non-metallic casing surrounding the non-metallic core;
a tube on the top surface of the non-metallic core and non-metallic casing;
wherein the non-metallic core is adhered to the non-metallic casing by an adhesive; and
wherein the tube is positioned on a self-expanding foam layer on the top surface of the non-metallic core.

2. The backshell of claim 1 wherein a cross section of the non-metallic core is honey combed shaped.

3. The backshell of claim 1 wherein the non-metallic core is made of a plurality of thin composite panels.

4. The backshell of claim 1 wherein the tube is a bent metallic tube.

5. The backshell of claim 4 wherein the tube includes a curved back side that is connected to a straight side such that the curved side is opposite the straight side.

6. The backshell of claim 1 including a structural member extending from an inner portion of the backshell of a first side of the backshell to an inner portion of an inner portion of a second side of the backshell.

7. The backshell of claim 6 wherein the first side is opposite the second side.

8. The backshell of claim 1 including a structural support back extending along the periphery of a lower edge of the backshell.

9. An energy absorbing backshell including:
a non-metallic core;
a non-metallic casing surrounding the non-metallic core;
a tube on the top surface of the non-metallic core and non-metallic casing; and
a structural support member;
wherein the non-metallic core is adhered to the non-metallic casing by an adhesive film; and
wherein the tube is positioned on a self-expanding foam layer on the top surface of the non-metallic core.

10. The energy absorbing backshell of claim 9, wherein the structural support member extends from the inner portion of one side of the backshell to the inner portion of an opposite side of the backshell.

11. The energy absorbing backshell of claim 9, wherein the non-metallic core is honey combed shaped.

12. The energy absorbing backshell of claim 9, wherein the non-metallic core is made of plurality of thin composite panels.

13. The energy absorbing backshell of claim 9, wherein a top surface of the non-metallic casing is affixed to the tube by a filler material.

14. The energy absorbing backshell of claim 13, wherein the tube is a bent metallic tube.

15. An energy absorbing backshell including:
a structural support base portion and a backshell shell;
the backshell shell comprising:
a non-metallic core;
a non-metallic casing surrounding the non-metallic core; and
a tube on the top surface of the non-metallic core and non-metallic casing;
wherein the non-metallic core is adhered to the non-metallic casing by an adhesive;
wherein the tube is positioned on a self-expanding foam layer on the top surface of the non-metallic core.

16. The energy absorbing backshell of claim 15, wherein the structural support base portion extends around a lower portion of the backshell shell.

17. The energy absorbing backshell of claim 15, wherein the structural support base portion includes an extension portion that extends beyond an edge of the backshell shell.

18. The energy absorbing backshell of claim 15, wherein the tube extends along a top edge of the backshell shell.

19. The energy absorbing backshell of claim 15, wherein a structural support member is coupled with the structural support base portion.

20. The energy absorbing backshell of claim 15, wherein the structural support member extends between a first inner portion of the structural support base portion and a second inner portion of the structural support base portion.

* * * * *